UNITED STATES PATENT OFFICE.

RICHARD THRELFALL, OF PRESTON, ENGLAND.

METHOD OF TREATING FLUE-DUST AND FUME OBTAINED FROM SULFID ORES.

SPECIFICATION forming part of Letters Patent No. 627,024, dated June 13, 1899.

Application filed January 16, 1899. Serial No. 702,333. (No specimens.)

*To all whom it may concern:*

Be it known that I, RICHARD THRELFALL, a subject of the Queen of Great Britain, residing at Preston, England, have invented a new and useful Improved Method of Treating Flue-Dust and Fume Obtained from Sulfid Ores, (for which I have applied for a patent in Great Britain, No. 11,940, dated May 26, 1898, and in France, No. 271,039, dated November 18, 1898;) and I do hereby declare that the following is a full, clear, and exact description of the invention, which will enable others skilled in the art to which it appertains to make and use the same.

The flue-dust and fume to which this invention refers is mainly produced during the smelting of ores containing sulfids of lead and zinc. It is also produced to some extent in the process of roasting these ores, and particularly in the process of Ellershausen, (British Patent No. 16,808 of 1897.) The composition of this flue-dust depends, of course, upon the ore which is treated.

I use the expression "flue-dust and fume" to cover all the solid matters carried out of a furnace in the process of smelting. In carrying out the Ellerhausen process there escapes from the furnace chiefly altered matter—to wit, oxids of lead and zinc, sulfate of lead, and very little unaltered dust, which must be regarded simply as an impurity. My process is intended to apply to flue-dust and fume of this description. One analysis of this flue-dust and fume from an ore rich in lead and low in zinc is as follows: sulfate of lead, 65.56; oxid of lead, 25.85; oxid of zinc, 5.95, the balance of one hundred parts being made up chiefly of unaltered material. It is obvious that the proportions of the above constituents will vary with different ores. My process applies only to the altered constituents.

In many cases it is found necessary to separate the zinc more or less from the lead and silver constituents of the flue-dust by leaching before the latter can be prepared for smelting, and the leaching itself may be performed with suitable agitation in any suitable vessel or vessels and at any desired temperature.

My invention consists in effecting the desired separation by means of a solution of sodium (or potassium) hydrogen sulfate. Such a solution dissolves the zinc constituents, leaving the compounds of lead and silver. The most convenient source of sodium hydrogen sulfate for my purpose is the so-called "niter cake," a residue obtained from the vessels in which nitric acid is produced by the action of sulfuric acid upon sodium nitrate. The solution of sodium or potassium hydrogen sulfate which is employed to leach the flue-dust may be of any convenient strength, provided that it is not so strong as to lead to a premature crystallizing out of the salts which it contains after the leaching is accomplished. The zinc may be recovered from the solution by any suitable process; but this invention is particularly applicable to a process of zinc extraction in which the zinc as sulfid is precipitated from the solution by a solution of sulfid (or mixtures of sulfids) of sodium. In this case the sulfid of zinc is separated in any suitable manner, such as filter-pressing, from the solution, which then contains a mixture of sodium sulfate with other salts, whose amount and nature depend upon the special circumstances of the original leaching. The solution is evaporated down to a convenient point, so as to allow of the recovery of the neutral sodium sulfate and of such other sodium salts as may be present, and may be conveniently reconverted into sodium sulfid by known processes. The reaction when sodium hydrogen sulfate is employed may be indicated as follows:

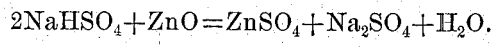

$$2NaHSO_4 + ZnO = ZnSO_4 + Na_2SO_4 + H_2O.$$

The sodium hydrogen sulfate thus acts not only as a leaching agent, but also as a source of sodium sulfid, and in this manner makes up more or less for the losses of sodium which necessarily occur in the cycle of operations.

Having now particularly described and ascertained the nature of my said invention and in what manner the same is to be performed, I declare that what I claim is—

In the treatment of flue-dust and fume from sulfid ores, the separation of the zinc from the lead constituents by leaching out the former by means of a solution of alkali metal hydrogen sulfate, substantially as herein described.

RICHARD THRELFALL.

Witnesses:
G. T. REDFERN,
JOHN E. BOUSFIELD.